United States Patent
Shmilovich et al.

(10) Patent No.: US 7,878,458 B2
(45) Date of Patent: Feb. 1, 2011

(54) METHOD AND APPARATUS FOR ENHANCING ENGINE-POWERED LIFT IN AN AIRCRAFT

(75) Inventors: Arvin Shmilovich, Huntington Beach, CA (US); Yoram Yadlin, Irvine, CA (US); Robert D. Gregg, III, Fullerton, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 331 days.

(21) Appl. No.: 11/927,290

(22) Filed: Oct. 29, 2007

(65) Prior Publication Data

US 2009/0108141 A1    Apr. 30, 2009

(51) Int. Cl.
*B64C 21/04* (2006.01)
(52) U.S. Cl. .................. 244/207; 244/215; 244/12.5
(58) Field of Classification Search ............... 244/12.5, 244/12.6, 23 D, 198, 199.1, 200, 200.1, 201, 244/207, 203, 204, 204.1, 211, 212, 213, 244/215, 216, 217, 130, 132; 114/272, 273, 114/281, 282
See application file for complete search history.

(56) References Cited

U.S. PATENT DOCUMENTS

| | | | | |
|---|---|---|---|---|
| 3,360,218 A | * | 12/1967 | Miller | 244/12.5 |
| 3,697,020 A | * | 10/1972 | Thompson | 244/12.2 |
| 3,960,345 A | * | 6/1976 | Lippert, Jr. | 244/130 |
| 4,019,696 A | | 4/1977 | Hirt et al. | |
| 4,426,054 A | | 1/1984 | Wang | |
| 4,447,028 A | | 5/1984 | Wang | |
| 4,645,140 A | * | 2/1987 | Bevilaqua et al. | 244/12.1 |
| 4,674,717 A | * | 6/1987 | Loebert | 244/207 |
| 5,170,964 A | * | 12/1992 | Enderle et al. | 244/52 |
| 5,253,828 A | * | 10/1993 | Cox | 244/200.1 |
| 5,575,442 A | * | 11/1996 | Tai | 244/198 |
| 6,926,229 B2 | | 8/2005 | Cummings et al. | |
| 2004/0129838 A1 | * | 7/2004 | Lisy et al. | 244/199 |

FOREIGN PATENT DOCUMENTS

| | | | | |
|---|---|---|---|---|
| FR | 2554081 A1 | * | 5/1985 | |
| GB | 2051706 A | * | 1/1981 | |
| JP | 54098000 A | * | 8/1979 | |
| WO | PCT/US2008/076950 | | 9/2008 | |

OTHER PUBLICATIONS

"YC-14 Advanced Medium STOL Transport (AMST)", http://www.globalsecurity.org/military/systems/aircraft/c-14.htm.

* cited by examiner

*Primary Examiner*—Joshua J Michener
(74) *Attorney, Agent, or Firm*—Tung & Associates

(57) ABSTRACT

Lift produced by an airfoil of an aircraft is increased by suppressing fluid detachment from the surface of the airfoil. An engine cowling extends outwardly from the surface of the airfoil that has an exit plane configured for directing exhaust gases toward a rear of the aircraft. Fences extending outwardly from the surface and proximate to the exit plane of the engine cowling are configured to guide the exhaust gases along at least a portion of the airfoil surface, thereby restricting spanwise movement of the gases and increasing the Coanda Effect exhibited by the gases, thereby increasing the amount of lift produced along the surface of the airfoil. Such techniques may be used in short take-off and landing (STOL) aircraft.

20 Claims, 3 Drawing Sheets

METHOD AND APPARATUS FOR ENHANCING ENGINE-POWERED LIFT IN AN AIRCRAFT

TECHNICAL FIELD

The embodiments described herein generally relate to producing lift in an aircraft, and more particularly relate to methods and apparatus for increasing engine-powered lift produced along a surface of an aircraft.

BACKGROUND

Scientists and engineers continue to seek improvements in all areas of aircraft performance. Recent military campaigns, for example, have demonstrated an increased need for improved short takeoff and landing (STOL) performance to allow aircraft to operate in environments where modern airports and other landing facilities may not be available. In particular, it is desirable to create aircraft that are able to takeoff and/or land even on short runways.

One way to improve STOL performance is to increase the amount of lift produced along the airfoil surfaces of the aircraft. By increasing the lift capability of each wing, for example, the aircraft can become airborne at a lower airspeed, thereby reducing the length of runway needed for takeoff. Various aircraft designs have attempted to maximize the amount of lift produced along an airfoil surface through exploitation of the well-known Coanda Effect. In many of these designs, air moving over the wing can be "bent down" towards the ground using flaps and a jet blowing over a curved surface to increase the amount of lift produced. Aircraft that have successfully exploited the Coanda Effect for STOL purposes include the Boeing YC-14 and C-17 Globemaster III, as well as various types of unmanned aerial vehicles (UAVs) and the like. Nevertheless, there remains a desire for aircraft designs with even better STOL performance.

BRIEF SUMMARY

Lift produced by an airfoil of an aircraft is increased by reducing fluid movement away from the surface of the airfoil. The fluid movement away from the surface is often referred to as flow separation, which is a measure of flow inefficiency. In one embodiment, an engine cowling extends outwardly from the surface of the airfoil that has an exit plane configured for directing exhaust gases toward a rear of the aircraft. One or more fences extending outwardly from the surface and proximate to the exit plane of the engine cowling are configured to guide the exhaust gases along at least a portion of the airfoil surface, thereby restricting span-wise movement of the gases and reducing flow separation. This results in augmentation of the Coanda Effect exhibited by the gases, thereby increasing the amount of lift produced along the surface of the airfoil.

In another embodiment, an aircraft is provided with a first and a second airfoil each having a cowling extending outwardly from a surface of the airfoil. A first engine and a second engine are associated with the cowlings of the first and second airfoils, respectively, wherein the first and second engines are configured to produce exhaust gases that are directed toward an aft end of the aircraft by the cowlings. Fences disposed on the first and/or the second airfoils proximate to the cowlings guide the exhaust gases along the surfaces of the first and second airfoils.

Another exemplary embodiment provides a method of increasing the lift produced along a surface of an airfoil of an aircraft. Exhaust gases are generated and directed toward a rear end of the aircraft. The exhaust gases are then guided along the surface of the airfoil with one or more fences extending outwardly from the surface of the airfoil to thereby restrict three-dimensional movement of the exhaust gases away from the surface.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Generally speaking, the amount of lift produced along a surface of an aircraft can be increased by improving the flow of air over the surface. Especially in the case of STOL aircraft designed to exploit the Coanda Effect, lift can be reduced by three-dimensional effects whereby air flowing across an airfoil detaches from the surface of the aircraft. By restricting the three-dimensional effects of airflow and instead encouraging two-dimensional flow across the surface, the Coanda Effect along the surface is suitably increased, thereby resulting in increased lift.

One way to reduce three-dimensional airflow along a surface of an aircraft is to provide one or more fences that can restrict the flow of air across a flap or other surface. Such fences can be deployed at least during takeoff, approach and/or landing to provide augmented lift. In various embodiments, the fences can be retracted or otherwise stowed while the aircraft is in cruise. By reducing three-dimensional effects of airflow while the fences are in use, the Coanda Effect produced on the surface of an airfoil can be improved. The flow becomes streamlined to the surface, thereby resulting in increased lift and improved STOL performance for the aircraft.

Figure 1:
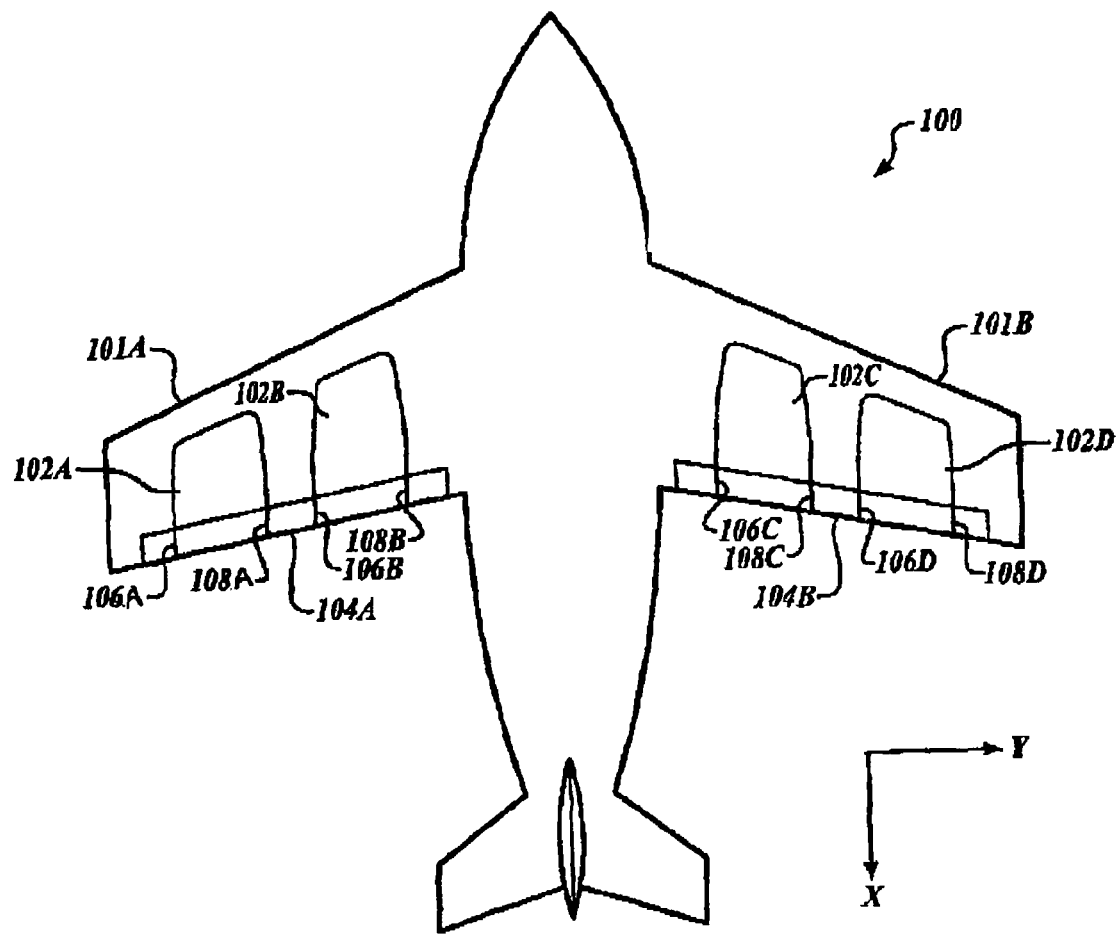
FIG. 1 is a top view of an exemplary aircraft with improved lift capabilities.

With reference now to FIG. 1, an exemplary aircraft 100 suitably includes one or more airfoils 101A-B that produce lift in response to fluid flow across the surface of the airfoil. In various embodiments, aircraft 100 exploits Coanda Effects produced along the airfoils 101A-B for improved STOL performance. To that end, aircraft 100 may include any number of engines that produce exhaust gases expelled along the surfaces of airfoils 101A-B toward the rear end of aircraft 100. One technique for producing lift with engine exhaust passing over a flap or other airfoil surface is the so-called upper surface blowing (USB) design used in the YC-14, among others. In such embodiments, engine exhaust emanates from engine cowlings 102A-D that extend outwardly from the surfaces of airfoils 101A-B. In such embodiments, exhaust gases are directed along a surface of a flap 104A-B or other control surface associated with airfoil 101A-B as appropriate. In various embodiments, flaps 104A-B are extended during takeoffs and/or landings that demand STOL performance, and engine exhaust from cowlings 102A-D suitably flows across the surfaces of flaps 104A-B to provide increased lift in response to Coanda Effects occurring as exhaust gases flow along the curved surface of the airfoil formed by the wing 101 and/or flap 104 of aircraft 100.

Engine exhaust may alternately be applied to flaps 104 and/or to other surfaces from sources other than cowlings 102A-D. A nozzle and/or other structure attached to the engine, for example, could be used to direct exhaust gases in any desired manner. One example of an aircraft design that exploits USB effects to increase lift produced across a wing/flap structure is described in U.S. Pat. No. 6,926,229, although many other designs could be equivalently applied in other embodiments. To that end, aircraft 100 is any type of manned or unmanned vehicle capable of producing lift though the direction of engine exhaust across the surface of any wing, flap, control surface and/or other airfoil 10A-B. Aircraft 100 may therefore be designed according to conventional USB principles, and/or may incorporate other designs and lift-generating techniques in a wide array of equivalent embodiments.

As noted above, the Coanda Effects of engine exhaust flowing across the surface of airfoils 101A-B can significantly increase the amount of lift applied to aircraft 100, particularly when the flaps 104A-B are deployed. Coanda Effects, in turn, are increased when the exhaust plume flows across the airfoil surface in a predominantly two-dimensional manner; that is, when the exhaust flow "sticks" to the surface of the airfoil instead of breaking away from the surface in a more three-dimensional manner.

This two-dimensional movement can be encouraged by providing a lateral "bound" for the exhaust flow in the form of one or more mechanical "fences" 106, 108. These fences 106, 108 are any mechanical structures capable of limiting airflow "spreading" across the surface of airfoil 101A-B and/or flap 104A-B that could otherwise result in vortices or other three-dimensional effects that could reduce Coanda Effects produced by the exhaust flow. Fences 106, 108 may be formed of metal, carbon composite and/or any other appropriate material, and may be shaped as desired and placed on the surface of airfoils 101A-B in any location. Fence patterns used in various embodiments can exhibit widely varying forms; fences may project from the surface 101A-B at any shape or angle, for example, to create any desired profile. Fences 106, 108 may be designed to exhibit predominantly smooth, serrated or wavy edges, or to exhibit regular or irregular shapes and other features. Further, fences 106, 108 may be formed with any uniform or non-uniform length, thickness and/or density.

Fences 106, 108 may be deployed in any quantities, and at any location(s) on airfoil 101. In various embodiments, fences 106, 108 are provided to prevent lateral spreading of exhaust across an airfoil surface; to that end, fences 106, 108 may be located on the surface over which Coanda Effects are produced. That is, since fences 106, 108 are intended to limit lateral spreading of airflows across a surface of a wing, flap or other airfoil 101, the fences may be deployed on the actual surface where lift is generated (e.g. on the flap 104). Further, in various embodiments, fences may be aligned approximately in parallel with the primary direction of exhaust flow (e.g. along the long axis of the aircraft). These aspects are in contrast to conventional vortex generator structures that generally strive to re-energize the viscous boundary layers of airfoils by creating three-dimensional vortices within the boundary layer being re-energized, and which are generally displaced at an angle that disrupts the predominant airflow across the surface of the airfoil. Notwithstanding these distinctions, various embodiments of fences 106, 108 may be displaced in a manner that is at least somewhat angled with respect to the direction of airflow (e.g. to direct exhaust flow outwardly from the axial direction of exhaust flow), or that are located and/or otherwise arranged in any manner that is appropriate for the particular aircraft design and performance parameters desired.

As shown in the exemplary embodiment of FIG. 1, each engine cowling 102 has an associated set of fences 106, 108 that guide exhaust gases flowing across flaps 104A-B to restrict exhaust flow in a lateral direction. These fences 106A-D, 108A-D are implemented as any sort of moveable or stationary outcroppings that project outwardly from the surfaces of airfoils 101A-B to restrict three-dimensional airflow. In the embodiment of FIG. 1, each engine cowling 102A-D emits engine exhaust that is at least partially contained by a left side fence 106A-D and a right side fence 108A-D (respectively) to restrict spreading of exhaust gas across the surfaces of flaps 104A-B that could otherwise result in vortices or other three-dimensional effects that could reduce the amount of lift produced. Additional fences, although not shown in FIG. 1, could be provided as well, and/or the fences shown could be differently located as appropriate and desired.

Figure 2:
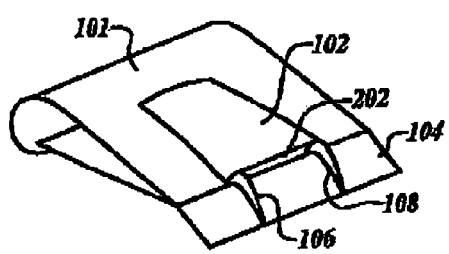
FIGS. 2, 2A and 3 are perspective views of exemplary airfoils with improved lift-generating capabilities.
Figure 3:
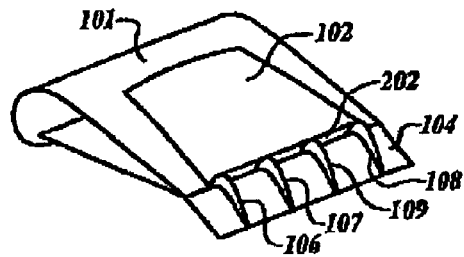

FIGS. 2 and 3 show more detailed views of exemplary airfoils 101 that include fences 106 and 108. As shown in these figures, an engine cowling 102 extends outwardly from the surface of a wing or other airfoil 101, or some other source of exhaust gases is provided. Engine exhaust is directed toward flap 104 by exit plane 202 or some other structure (e.g. a nozzle or the like) associated with the engine and/or cowling 102. The exhaust plume flowing across flap 104 is then contained by fences 106, 108 (FIG. 2) or by fences 106-109 (FIG. 3) as appropriate. Any number of fences 106-109 may be deployed in a wide array of equivalent embodiments. Similarly, the fences 106-109 may be located in any position on airfoil 101 and/or flap 104 to provide the performance desired. Two fences 106, 108 may be provided in association with the left and right sides of engine cowling 102, for example, as shown in FIGS. 2-3, and/or any other fences may be placed at any point on airfoil 101 and/or flap 104 where restriction of three-dimensional airflow is desired. As noted above, the fences 106-109 serve to restrict airflow to the surface of flap 104, thereby reducing vortices and other three-dimensional effects, which in turn results in increased Coanda Effects and increased lift. Other embodiments different from those shown in the drawing figures may also be formulated. In aircraft with one or more fuselage-mounted engines, for example, a single fence (or multiple fences) could be located near an engine cowling or nozzle at the edge opposite of the fuselage to contain exhaust flow along the body of the aircraft. The concept of containing exhaust flow to prevent three-dimensional effects can be applied in any manner, using any type of fences or other structures at any location on the aircraft surface.

Figure 2A:
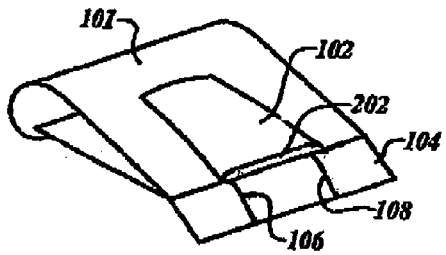

In various embodiments, fences 106-109 may be extended during takeoffs, approaches to landings and/or landings when improved STOL performance is desired, and otherwise retracted. For example, FIG. 2A shows fences 106-108 in a retracted position within the flap. Extension/retraction of fences e.g., 106-109 (or 106-108) may be performed in any manner. Fences e.g., 106-109 may be hinged and hydraulically actuated, for example, or otherwise actuated using any sort of electromechanical actuation device. In some embodiments, fences e.g., 106-109 are extended in response to pilot commands; alternately, fences e.q., 106-109 are extended automatically as flaps 104 are extended from airfoil 101. Again, fences e.g., 106-109 may be designed to be moveable in any manner, or may be stationary as appropriate for the particular aircraft design and performance desired.

Figure 4:
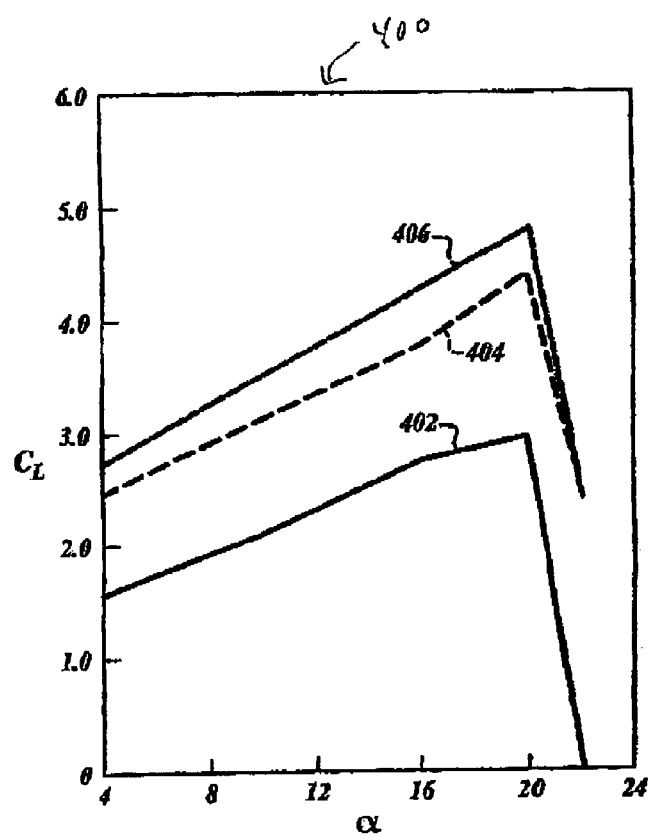
FIG. 4 is a plot showing exemplary differences in lift that may be produced with an exemplary embodiment.

The improvements in lift produced when fences 106-109 are deployed have been discovered to be significant in many embodiments. FIG. 4, for example, shows the improvements in lift observed in one exemplary implementation. Plot 400 is a conventional lift coefficient curve wherein the dimensionless lift coefficient ($C_L$) is plotted with respect to angle of attack ($\alpha$) for an airfoil. Three traces 402, 404, 406 are shown, with trace 402 showing exemplary performance with the engine off, trace 404 showing exemplary performance with the engine on, and trace 406 showing performance with the engine on and fences 106, 108 deployed. As can be seen from plot 400, about 15% more lift is generated when fences 106, 108 are deployed, in comparison to lift produced when the fences are not deployed. This improvement is relatively consistent for all values of airfoil angle of attack.

Figure 5:
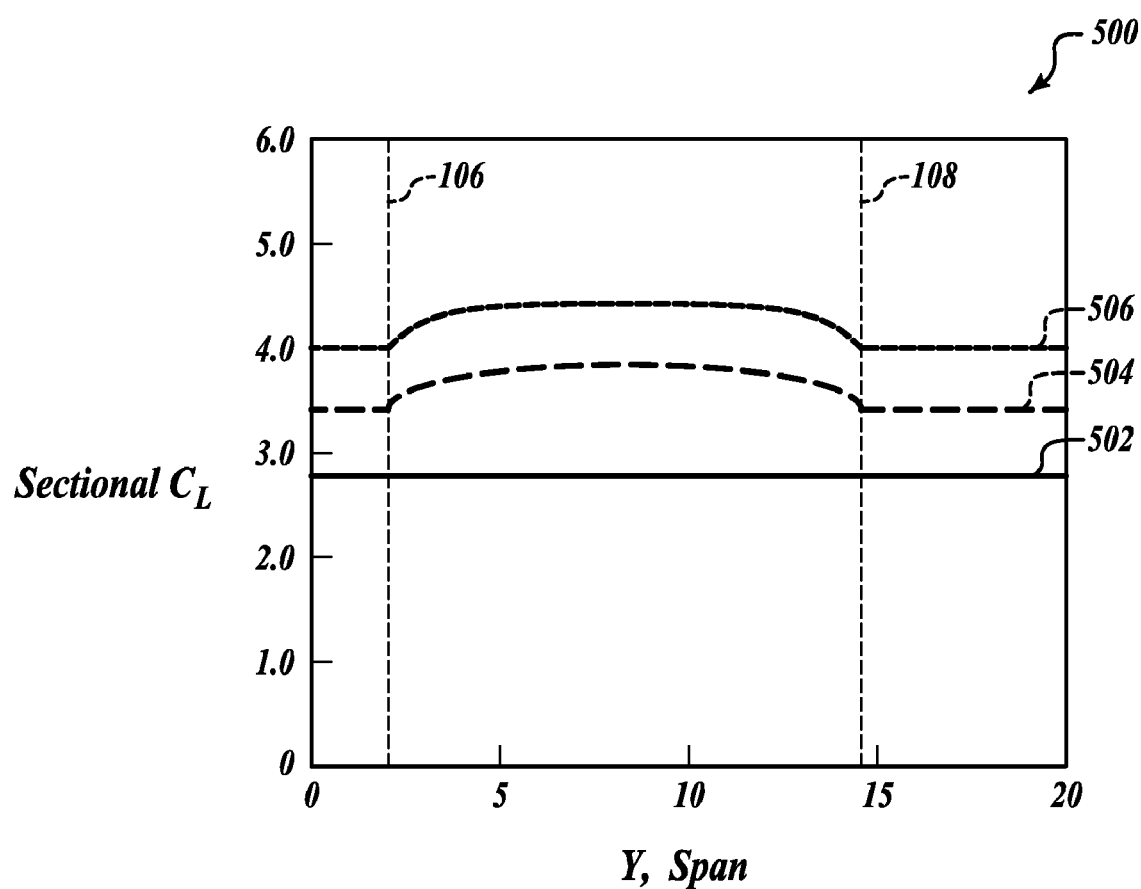
FIG. 5 is a plot showing the improved load distribution resulting from one exemplary embodiment.

Moreover, improved load distribution has been observed when fences 106, 108 are deployed. FIG. 5 shows an exemplary plot 500 of dimensionless sectional lift coefficient ($C_L$) plotted across the physical span of airfoil 101. In the exemplary embodiment used to generate plot 500, fences 106 and 108 are placed at the left and right edges, respectively, of an engine cowling 102 that lies between the fences. In this example the height of fence 106 is a little shorter than the height of fence 108. Plot 500 shows three traces 502, 504 and 506 wherein trace 502 shows lift produced with the engine off, trace 504 shows lift produced with the engine on but no fences deployed, and trace 506 reflects lift produced with the engine on and fences deployed. By comparing traces 504 and 506 in plot 500, it can be seen that trace 506 is more level than trace 504 in the space between fences 106 and 108, reflecting that lift is generated more evenly across the span of airfoil 101 when the fences are deployed. Hence, it has been shown in practice that fences 106, 108 (as well as any additional fences 107, 109, etc.) can both improve load distribution across the surface of an airfoil 101, as well as increasing the overall lift produced by the airfoil itself.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An airfoil for an aircraft, the airfoil comprising:
    a surface;
    an engine cowling extending outwardly from the surface and having an exit plane configured to direct exhaust gases along the surface in a flow direction toward a rear of the aircraft; wherein said cowling comprises a leading edge located aft of a leading edge of said airfoil; and
    a plurality of fences extending outwardly from the surface and proximate to the exit plane of the engine cowling, wherein the plurality of fences is configured to bound lateral movement of the exhaust gases and to thereby guide the exhaust gases along at least a portion of the surface, said fences disposed on said surface immediately aft of said exit plane.

2. The airfoil of claim 1 wherein the plurality of fences is further configured to restrict three-dimensional movement of the exhaust gases away from the surface.

3. The airfoil of claim 1 wherein the plurality of fences is further configured to increase an overall Coanda Effect produced by the exhaust gases moving along the surface.

4. The airfoil of claim 1 wherein the surface comprises a wing surface and a flap surface, and wherein the flap surface is configured to be moveable relative to the wing surface.

5. The airfoil of claim 4 wherein the plurality of fences are disposed on the flap surface.

6. The airfoil of claim 5 wherein the plurality of fences is configured to be retractable with respect to the flap surface.

7. The airfoil of claim 1 wherein the plurality of fences is configured to be retractable with respect to the surface.

8. The airfoil of claim 1 wherein the plurality of fences are aligned to be substantially parallel to the flow direction of the exhaust gases.

9. The airfoil of claim 1 wherein the engine cowling comprises a left edge and a right edge, and wherein one of the plurality of fences corresponds to the left edge of the engine cowling and a second one of the plurality of fences corresponds to the right edge of the engine cowling.

10. The airfoil of claim 9 wherein the plurality of fences comprises at least one other fence in addition to the fences corresponding to the left and right edges of the engine cowling.

11. An aircraft comprising:
    a first and a second airfoil each having a cowling extending outwardly from a surface of the airfoil; wherein each cowling comprises a leading edge located aft of a corresponding leading edge of a corresponding airfoil;
    a first engine and a second engine associated with the cowlings of the first and second airfoils respectively, wherein the first and second engines are configured to produce exhaust gases that are directed in a flow direction toward an aft end of the aircraft by the cowlings; and
    a plurality of fences disposed on the first and on the second airfoils proximate to the cowlings to restrict lateral movement perpendicular to the flow direction of the exhaust gases and to thereby guide the exhaust gases along the surfaces of the first and second airfoils, said fences disposed immediately aft of said cowlings.

12. The aircraft of claim 11 further comprising a first flap and a second flap coupled to the first and second airfoils, respectively, and wherein the plurality of fences are disposed on an outer surface of the first and second flaps.

13. The aircraft of claim 11 wherein the plurality of fences are configured to be retractable into the first and second airfoils.

14. The aircraft of claim 11 wherein the first and second airfoils are wings, and wherein the surfaces of the airfoils are the upper surfaces of the wings.

15. The aircraft of claim 11 wherein the plurality of fences is further configured to restrict three-dimensional movement of the exhaust gases away from the surface of the airfoil.

16. The aircraft of claim 11 wherein the plurality of fences is further configured to increase an overall Coanda Effect produced by the exhaust gases moving along the surface of the airfoil.

17. The aircraft of claim 11 wherein the plurality of fences are aligned substantially parallel to the flow direction of the exhaust gases.

18. A method for increasing the lift produced along a surface of an airfoil of an aircraft, the method comprising the steps of:

generating exhaust gases directed toward a rear end of the aircraft; and guiding the exhaust gases along the surface of the airfoil with a plurality of moveable fences extending outwardly from an extended position on the surface of the airfoil to thereby restrict three-dimensional movement of the exhaust gases away from the surface of the airfoil, said fences disposed immediately aft of a cowlings wherein said cowling comprises a leading edge located aft of a leading edge of said airfoil.

19. The method of claim 18 further comprising the step of extending the plurality of fences from a retracted position within the surface of the airfoil to an extended position to facilitate the guiding of exhaust gases during takeoff and landing of the aircraft.

20. The method of claim 19 further comprising the step of retracting the plurality of fences from said extended position while the aircraft is in cruise.

* * * * *